(12) United States Patent
Yoshioka et al.

(10) Patent No.: US 8,784,741 B2
(45) Date of Patent: Jul. 22, 2014

(54) ELECTRICALLY-HEATED CATALYTIC CONVERTER

(75) Inventors: Mamoru Yoshioka, Susono (JP); Noriaki Kumagai, Susono (JP); Naoya Takagi, Mishima (JP); Tatsuo Iida, Anjo-ji (JP); Yasuo Kinoshita, Aichi-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/638,776

(22) PCT Filed: Apr. 6, 2010

(86) PCT No.: PCT/JP2010/056248
§ 371 (c)(1),
(2), (4) Date: Oct. 1, 2012

(87) PCT Pub. No.: WO2011/125177
PCT Pub. Date: Oct. 13, 2011

(65) Prior Publication Data
US 2013/0025267 A1    Jan. 31, 2013

(51) Int. Cl.
*B01D 50/00* (2006.01)

(52) U.S. Cl.
USPC .......................................... 422/177; 422/179

(58) Field of Classification Search
USPC .............. 422/174, 179, 180; 428/116; 55/523
See application file for complete search history.

(56) References Cited

U.S. PATENT DOCUMENTS 5,070,694 A * 12/1991 Whittenberger ................ 60/300
2009/0060800 A1 * 3/2009 Fernandes, Jr. ............... 422/168
2011/0023430 A1   2/2011 Kumar et al.

FOREIGN PATENT DOCUMENTS

| CN | 101821488 A | 9/2010 |
| JP | 02-027107 A | 1/1990 |
| JP | 03-245851 A | 11/1991 |
| JP | 04-171214 A | 6/1992 |
| JP | 5-96423 U | 12/1993 |
| JP | 2001-098928 A | 4/2001 |
| JP | 2002-349245 A | 12/2002 |
| JP | 2004-183501 A | 7/2004 |
| JP | 2008-267157 A | 11/2008 |
| JP | 2009-189921 A | 8/2009 |
| JP | 2010-209699 A | 9/2010 |
| JP | 2010-242724 A | 10/2010 |
| JP | 2010-270653 A | 12/2010 |
| JP | 2011-241751 A | 12/2011 |
| JP | 2012-072665 A | 4/2012 |
| JP | 2012-107567 A | 6/2012 |

OTHER PUBLICATIONS

International Search Report mailed May 18, 2010 of PCT/JP2010/056248.

* cited by examiner

Primary Examiner — Tom Duong
(74) Attorney, Agent, or Firm — Kenyon & Kenyon LLP

(57) ABSTRACT

An electrically-heated catalytic converter comprises a catalyst support which produces heat when electric current is applied, a holding mat made of an electrical insulating material, the holding mat being provided so as to cover an outer circumference of the catalyst support, and a case which houses the catalyst support and holds the catalyst support via the holding mat. The catalytic converter treats gas flowing in the case by a catalyst supported on the catalyst support. The holding mat has a water-absorbing property. An insulation layer made of an electrical insulating material is provided between the case and the holding mat.

8 Claims, 9 Drawing Sheets

ELECTRICALLY-HEATED CATALYTIC CONVERTER

This is a 371 national phase application of PCT/JP2010/056248 filed 06 Apr. 2010, the contents of which are incorporated herein by reference.

TECHNICAL FIELD

The present invention relates to a catalytic converter comprising a catalyst support which produces heat when electric current is applied.

BACKGROUND ART

There is known a catalytic converter which has a catalyst support made of an electrically-conductive material such as metal or silicon carbide (SiC) and supports a catalyst. In the catalytic converter, the catalyst is warmed up by heat which is produced when the electric current is applied to the catalyst support. In such catalytic converter, a case which houses the catalyst support and the catalyst support are insulated with each other so that the case and the catalyst support do not short-circuit. For example, there is known a catalytic converter which is housed and held in a cylindrical case via a mat covering an outer circumference of a metallic catalyst support, the mat being made of a ceramic material which is consisted primarily of ceramic fiber or the like (see patent literature 1). In addition, there are Patent Literatures 2, 3 as prior art references in relation to the present invention.

CITATION LIST

Patent Literatures

Patent Literature 1: JP-A-04-171214
Patent Literature 2: JP-A-2009-189921
Patent Literature 3: JP-A-2008-267157

SUMMARY OF INVENTION

Technical Problem

In the catalytic converter of the patent literature 1, there is insulated between the case and the support by the ceramic mat. However, since the mat is composed of ceramic fiber, water gets through an inside of the mat. That is, the mat has a water-absorbing property. When the mat absorbs water, an insulation resistance of the mat is decreased and there is a possibility that the support and the case make electrical contacts with each other.

In view of the foregoing, an object of the present invention is to provide an electrically-heated catalytic converter which can ensure an insulation between a catalyst support and a case even if a holding member which lies between the catalyst support and the case absorbs water.

Solution to Problem

An electrically-heated catalytic converter of the present invention comprises a catalyst support which produces heat when electric current is applied, a holding member made of an electrical insulating material, the holding member being provided so as to cover an outer circumference of the catalyst support, and a case which houses the catalyst support and holds the catalyst support via the holding member, wherein gas flowing in the case is treated by a catalyst supported on the catalyst support, wherein the holding member has a water-absorbing property, and an insulation layer made of an electrical insulating material is provided between the case and the holding member.

According to the catalytic converter of the present invention, it is possible to prevent the catalyst support and the case from connecting electrically to each other by the insulation layer even if the holding member absorbs water and the insulation resistance of the holding member is decreased. Thereby, it is possible to ensure the insulation between the catalyst support and the case.

In one embodiment of the catalytic converter of the present invention, a water absorption layer made of a material having a water-absorbing property may be provided between the catalyst support and the holding member. In this case, since water in the holding member is absorbed to the water absorption layer, it is possible to decrease a quantity of water in the holding member. Thereby, it is possible to suppress decreasing of the insulation resistance of the holding member.

In this embodiment, the water absorption layer may have a higher water absorbing property than the holding member. In this case, it is possible to facilitate the movement of the water from the holding member to the water absorption layer. Thereby, it is possible to further suppress decreasing of the insulation resistance of the holding member.

In one embodiment of the catalytic converter of the present invention, the case may be provided with a water interception member which has a penetrating hole which the gas passes through and is located on an upper stream side of a gas flow direction than the catalyst support so as to hide the holding member when an inside of the case is viewed from the upper stream side of the gas flow direction. In this case, it is possible to stop water by the water interception member even if water comes along an inner surface of the case from the upper stream side of the gas flow direction. Thereby, it is possible to suppress the water from reaching the insulation layer and the holding member. Since it is possible to suppress water from absorbing to the holding member, it is possible to decreasing of a quantity of water in the holding member. Accordingly, it is possible to further suppress decreasing of the insulation resistance of the holding member.

In this embodiment, the water interception member may be made of a material having a water-absorbing property. In this case, water which is stopped by the water interception member is absorbed to the water interception member. Thereby, it is possible to further suppress the water from reaching the insulation layer and the holding member.

The catalyst support which is provided in the catalytic converter of the present invention is enough as long as the catalyst support is made of a material which produces heat when electric current is applied. For example, the catalyst support may be made of silicon carbide.

DESCRIPTION OF EMBODIMENTS (First Embodiment)

Figure 1:
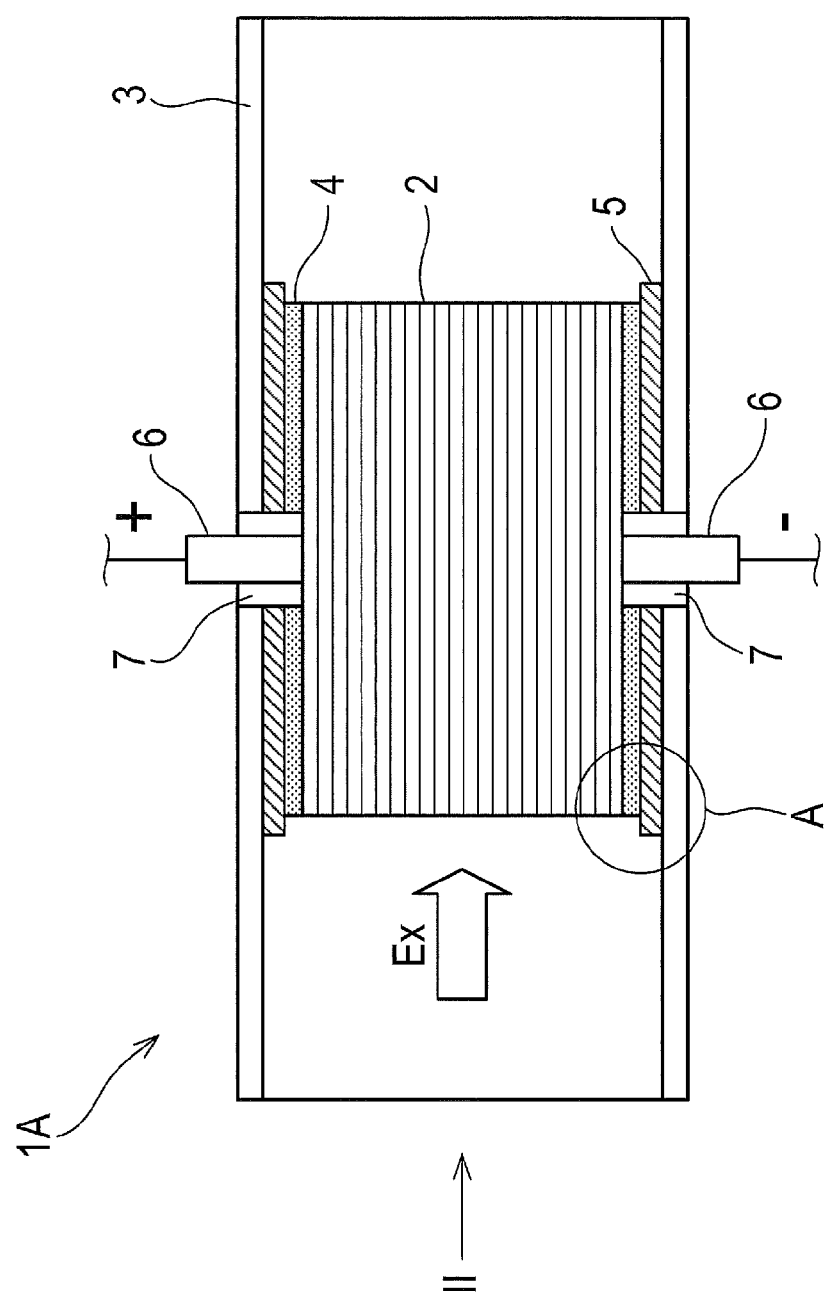
FIG. 1 is a view showing a catalytic converter according to a first embodiment of the present invention.
Figure 2:
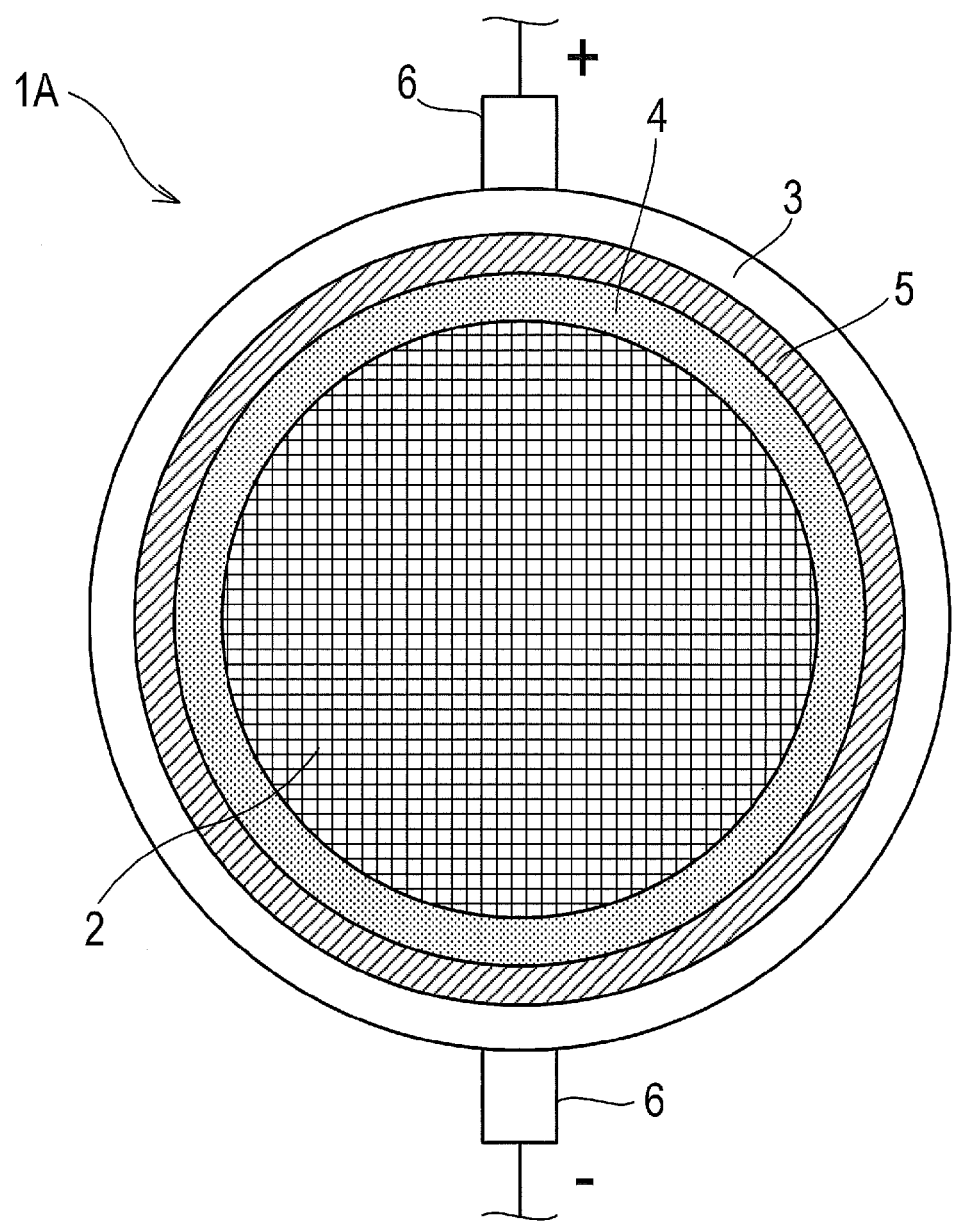
FIG. 2 is a view showing the catalytic converter viewed in a direction of an arrow II in FIG. 1.

FIG. 1 and FIG. 2 show a catalytic converter according to a first embodiment of the present invention. FIG. 2 shows the catalytic converter 1A in FIG. 1 viewed in a direction of an arrow II. The catalytic converter 1A is provided in an exhaust passage of an internal combustion engine in order to purify harmful components in exhaust gas. As shown by an arrow Ex in FIG. 1, the exhaust gas flows from the left side to the right side of FIG. 1 in the catalytic converter 1A. The catalytic converter 1A includes a cylindrical catalyst support 2 and a cylindrical case 3 which houses the catalyst support 2 inside thereof. The catalyst support 2 is housed in the case 3 concentrically. The catalyst support 2 is made of silicon carbide, and the case 3 is made of metal such as stainless steel. An inner structure of the catalyst support 2 may be the same as that of a well-known catalyst which is provided in the exhaust passage of the internal combustion engine in order to purify the exhaust gas. Thereby, a detailed description thereof will be omitted. On the catalyst support 2, a catalyst for purifying the exhaust gas such as a three-way catalyst, an oxidation catalyst, or a NOx occlusion-reduction catalyst is supported. Since the catalyst support 2 is made of silicon carbide, the catalyst support 2 has the nature of conducting electricity. Furthermore, the catalyst support 2 has a property of NTC (negative temperature coefficient) that an electrical resistance is decreased with increasing temperature. Since silicon carbide which is a material of the catalyst support 2 is a porous material, the catalyst support 2 has a water-absorbing property.

An outer circumference of the catalyst support 2 is provided with a holding mat 4 as a holding member. As shown in FIG. 2, the holding mat 4 covers over a whole outer circumference surface of the catalyst support 2. The case 3 holds the catalyst support 2 via the holding mat 4. The holding mat 4 is a mat which is obtained by forming fibers of alumina, an electric insulating material, in a mat shape. Thereby, the holding mat 4 has a high-temperature endurance and a water-absorbing property. The holding mat 4 has a lower water absorbing property than the catalyst support 2.

An insulation layer 5 is provided between the case 3 and the holding mat 4 around the entire circumference in a circumferential direction. The insulation layer 5 is composed of an electric insulating material that water is not absorbed, in other words, water is not penetrated. As the electric insulating material like this, for example, an electric insulating material including glass components is used.

The catalyst support 2 is provided with a pair of electrode terminals 6, 6 so as to be faced each other across the catalyst support 2. One electrode terminal 6 is connected to a positive electrode of an electric battery (not shown), and the other electrode terminal 6 is connected to a negative electrode of the electric battery. A cover 7 which is made of an electric insulating material is provided around each electrode terminal 6 so that the electrode terminal 6 is insulated from the case 3, the holding mat 4, and the insulation layer 5.

In the catalytic converter 1A, electric current is applied to the catalyst support 2 in order to warm up the catalyst which is supported on the catalyst support 2. As described above, since the catalyst support 2 is made of silicon carbide, the catalyst support 2 produces heat when the electric current is applied to the catalyst support 2. Thereby, the catalyst is warmed up by the heat. The catalytic converter 1A is configured as an electrically-heated catalytic converter in this manner. The catalyst of the catalytic converter like this is called an EHC (electrically heated catalyst).

Figure 3:
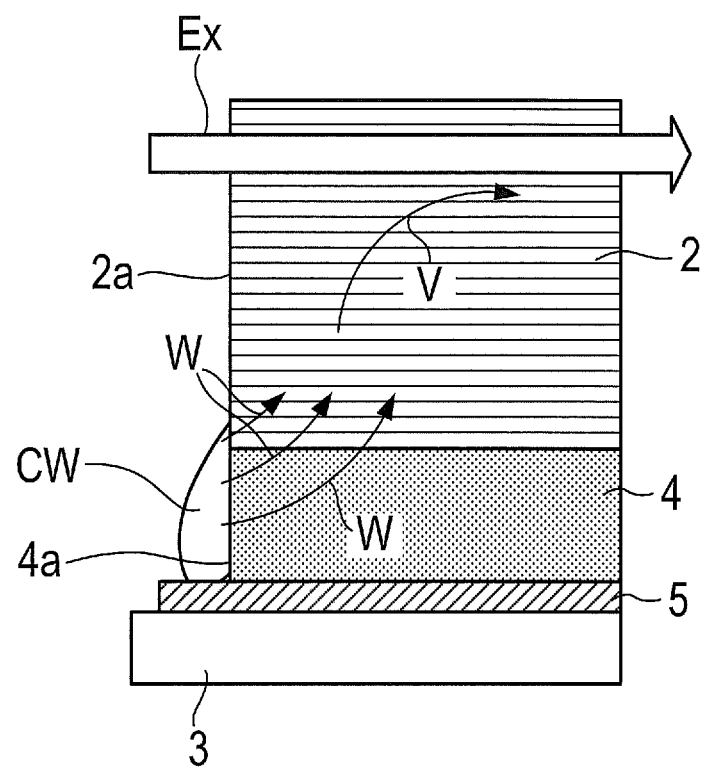
FIG. 3 is an enlarged view showing a range A in FIG. 1.

Next, a movement of water in the catalytic converter 1A will be described with reference to FIG. 3. FIG. 3 shows an enlarged view of a range A in FIG. 1. As well-known, water vapor is included in the exhaust gas of the internal combustion engine. Thereby, when the exhaust gas is cooled, the water vapor is condensed and condensed water CW is generated. When the condensed water CW adheres to an upstream side end face 2a of the catalyst support 2 and an upstream side end face 4a of the holding mat 4, the water is absorbed to the catalyst support 2 and the holding mat 4 as shown by an arrow W in this figure. The high temperature exhaust gas Ex passes in the catalyst support 2. Thereby, the water absorbed to the catalyst support 2 turns into water vapor and is discharged to the downstream as shown by an arrow V.

As described above, the catalyst support 2 has a higher water absorbing property than the holding mat 4. Furthermore, the water absorbed to the catalyst support 2 turns into water vapor and is discharged to the downstream. Thereby, an absorbed quantity of water of the catalyst support 2 becomes less than an absorbed quantity of water of the holding mat 4. The insulation layer 5 which prevents water penetration is provided between the holding mat 4 and the case 3. Thereby, the water absorbed to the holding mat 4 moves to the catalyst support 2. The water turns into water vapor and is discharged to the downstream as with the water absorbed to the catalyst support 2.

As described above, in the catalytic converter 1A according to the first embodiment, since the insulation layer 5 is provided between the holding mat 4 and the case 3, it is possible to prevent the catalyst support 2 and the case 3 from connecting electrically to each other even though the holding mat 4 absorbs the water and the insulation resistance of the holding mat 4 is decreased. Furthermore, in the catalytic converter 1A, since it is possible to move the water absorbed to the holding mat 4 to the catalyst support 2 quickly, it is possible to suppress decreasing of the insulation resistance of the holding mat 4. Thereby, it is possible to ensure the insulation between the catalyst support 2 and the case 3 even though the holding mat 4 absorbs the water.

(Second Embodiment)

Figure 4:
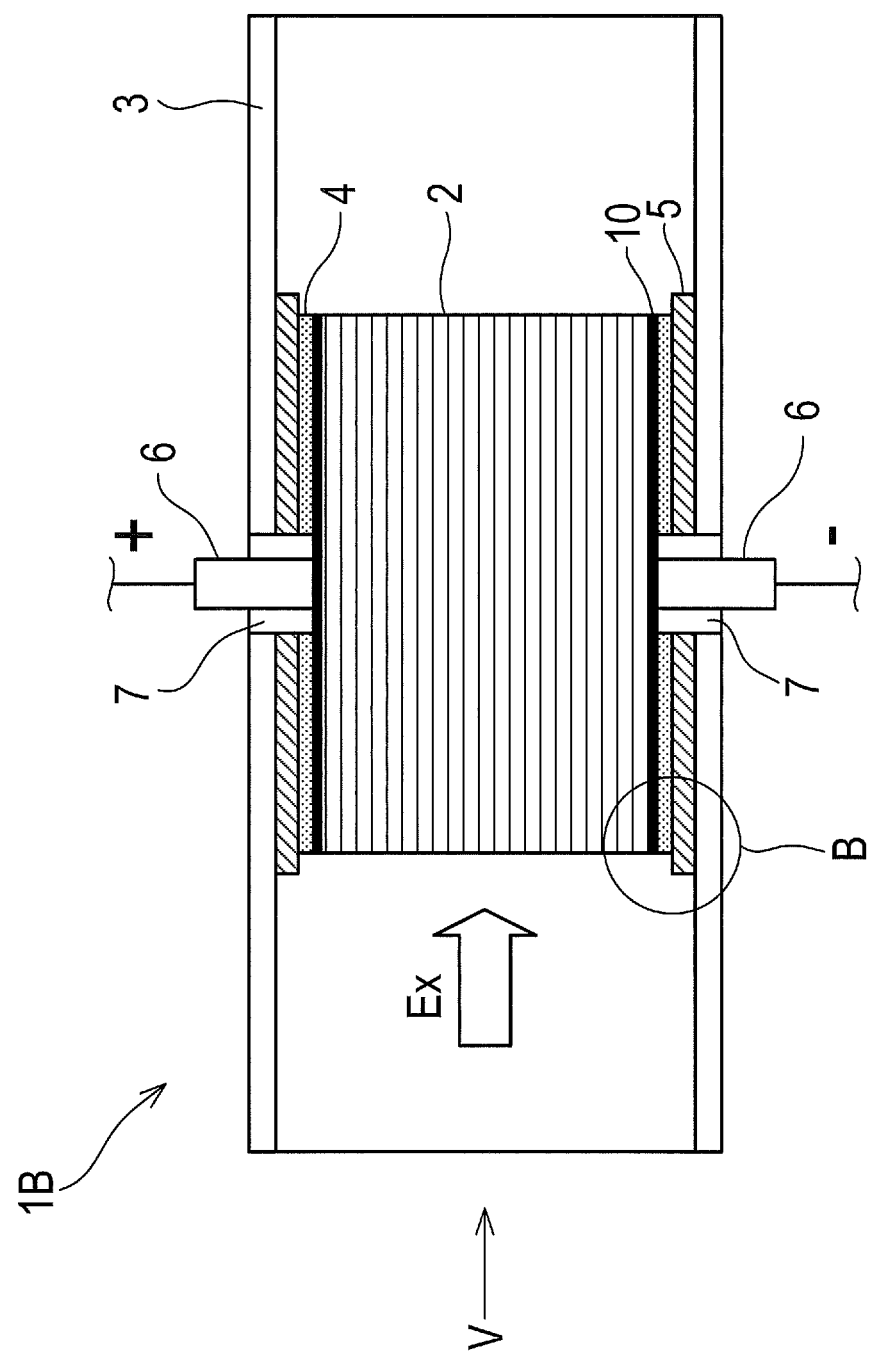
FIG. 4 is a view showing a catalytic converter according to a second embodiment of the present invention.
Figure 5:
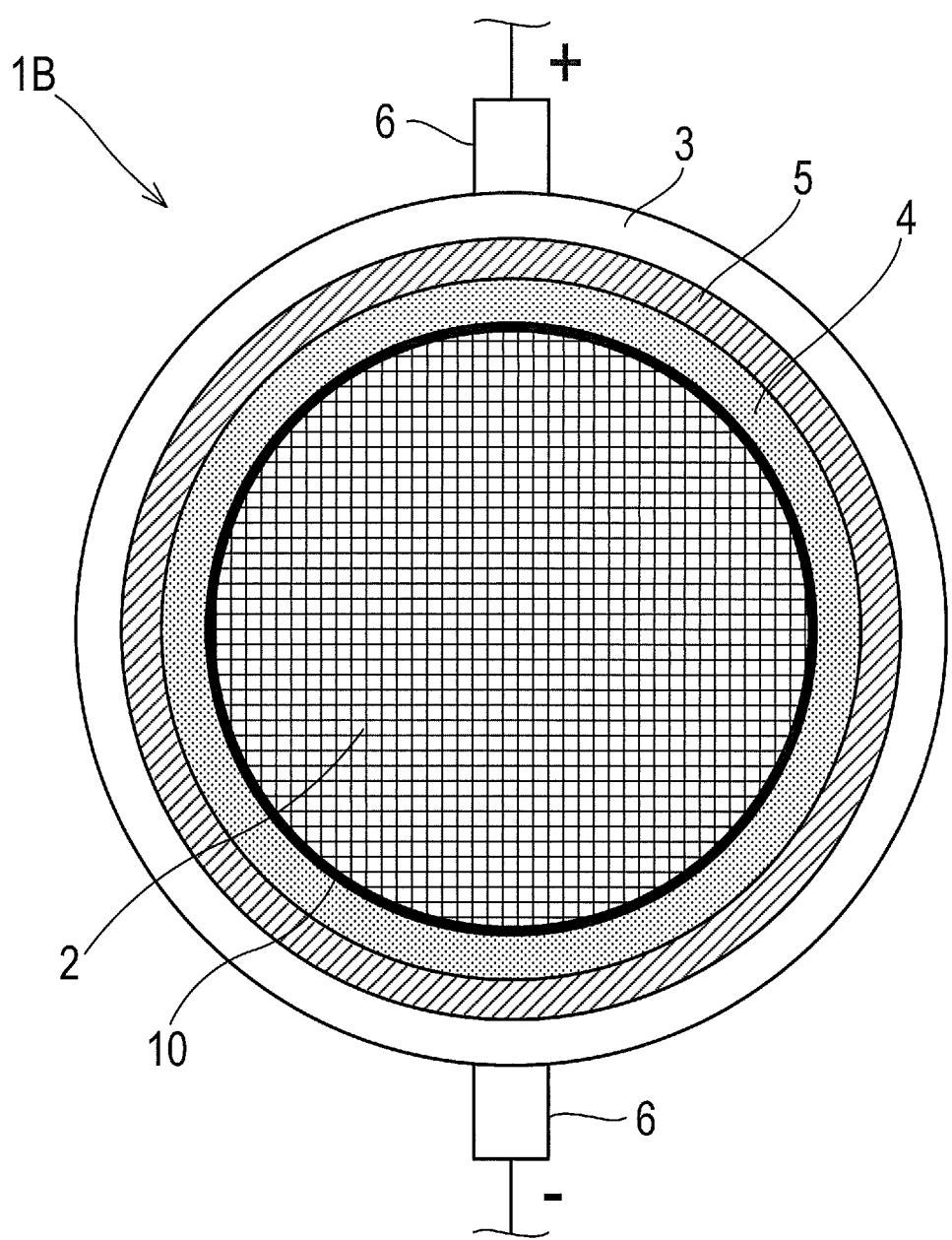
FIG. 5 is a view showing the catalytic converter viewed in a direction of an arrow V in FIG. 4.
Figure 6:
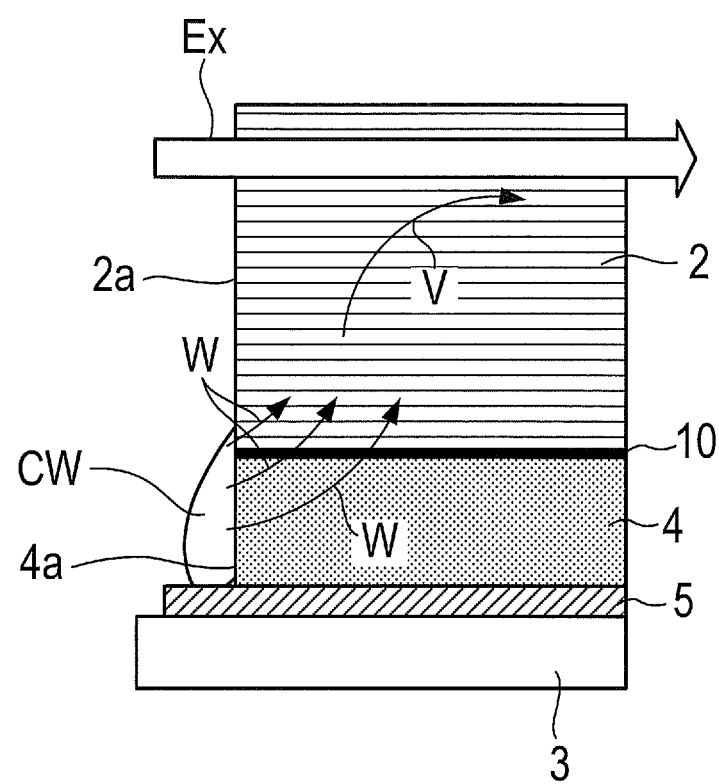
FIG. 6 is an enlarged view showing a range B in FIG. 4.

A catalytic converter 1B according to a second embodiment of the present invention will be described with reference to FIGS. 4-6. FIG. 5 shows the catalytic converter 1B viewed in a direction of an arrow V of FIG. 4. FIG. 6 shows an enlarged view of a range B in FIG. 4. In this embodiment, the same components as those in the first embodiment are denoted by the same reference numeral, and descriptions thereof will be omitted. As shown in FIG. 4 and FIG. 5, the second embodiment differs from the first embodiment in that a water absorption layer 10 is provided between the catalyst support 2 and the holding mat 4. Except this, the second embodiment is the same as the first embodiment.

The water absorption layer 10 is composed of a porous shaped material having a water-absorbing property. The water absorption layer 10 is provided by an evaporation coating of the material to the holding mat 4. A material which has a higher water absorbing property than the material composing the holding mat 4 is used to the material composing the water absorption layer 10. Thereby, the water absorption layer 10 has a higher water absorbing property than the holding mat 4.

A movement of water in the catalytic converter 1B will be described with reference to FIG. 6. In this embodiment, the water absorbed to the catalyst support 2 turns into water vapor by the heat of the exhaust gas and is discharged to the downstream. On the other hand, the water absorbed to the holding mat 4 moves to the water absorption layer 10 which has a higher water absorbing property than the holding mat 4. The water moved to the water absorption layer 10 further moves to the catalyst support 2. And then, the water turns into the water vapor and is discharged to the downstream.

In the catalytic converter 1B according to the second embodiment, since the water absorption layer 10 which has a higher water absorbing property than the holding mat 4 is provided between the catalyst support 2 and the holding mat 4, the water in the holding mat 4 moves to the water absorption layer 10 quickly. Thereby, it is possible to facilitate the movement of the water from the holding mat 4 to the catalyst support 2. Accordingly, it is possible to further suppress decreasing of the insulation resistance of the holding mat 4.

(Third Embodiment)

Figure 7:
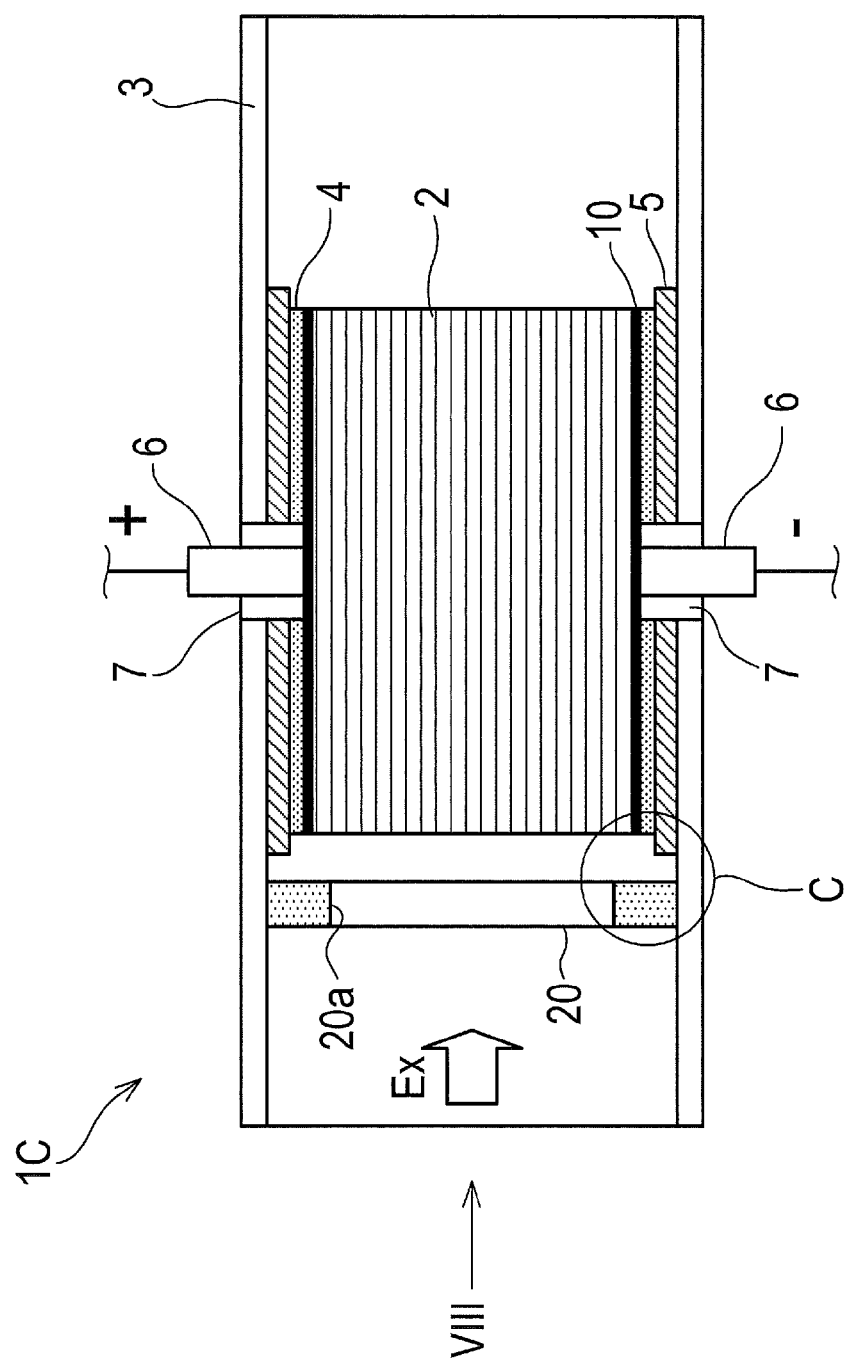
FIG. 7 is a view showing a catalytic converter according to a third embodiment of the present invention.
Figure 8:
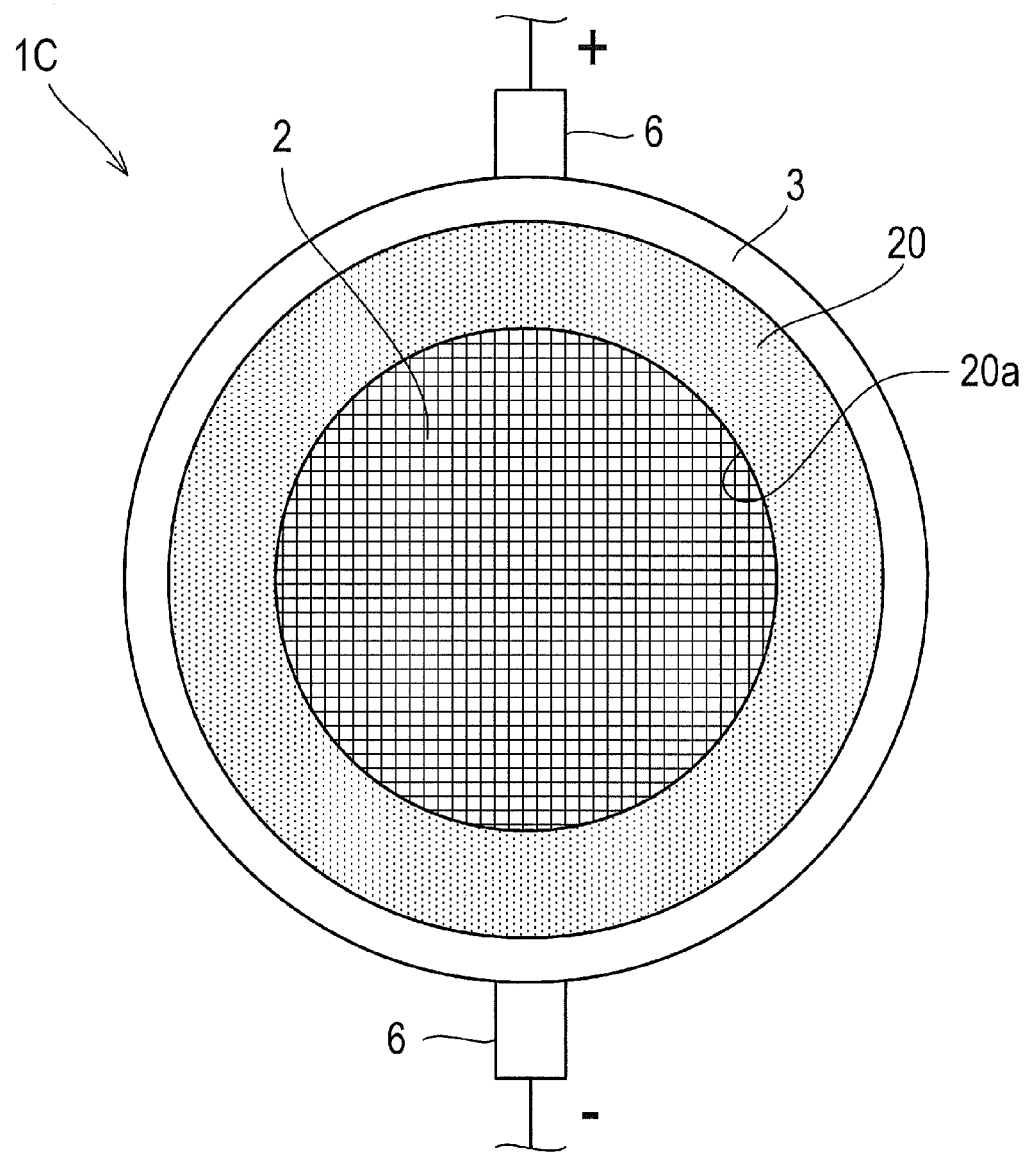
FIG. 8 is a view showing the catalytic converter viewed in a direction of an arrow VIII in FIG. 7.
Figure 9:
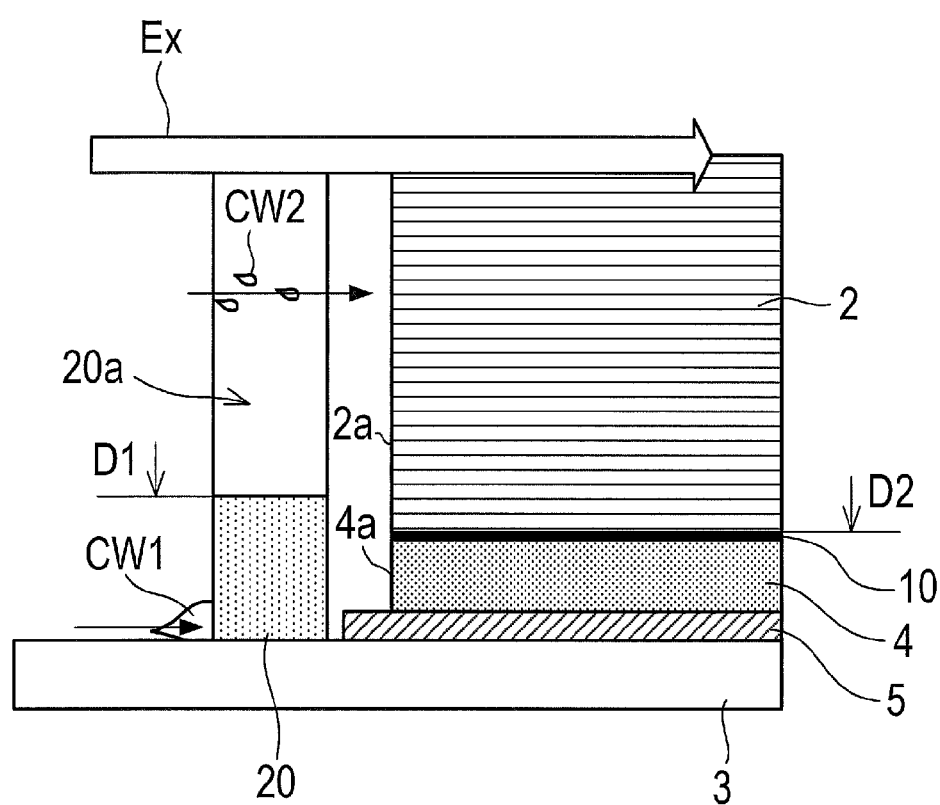
FIG. 9 is an enlarged view showing a range C in FIG. 7.

A catalytic converter 1C according to a third embodiment of the present invention will be described with reference to FIGS. 7-9. FIG. 8 shows the catalytic converter 1C viewed in a direction of an arrow VIII of FIG. 7. FIG. 9 shows an enlarged view of a range C in FIG. 7. In this embodiment, the same components as those in the above embodiments are denoted by the same reference numeral, and descriptions thereof will be omitted. As shown in FIG. 7 and FIG. 8, the third embodiment differs from the second embodiment in that a water interception wall 20 as a water interception member is provided in the case 3. Except this, the third embodiment is the same as the second embodiment.

The water interception wall 20 is formed of an annular shape. A penetrating hole 20a is provided in the center of the water interception wall 20. The exhaust gas passes through the penetrating hole 20a and flows into the catalyst support 2. As shown in FIG. 9, an inner diameter D1 of the penetrating hole 20a is smaller than an outer diameter D2 of the catalyst support 2. Thereby, as shown in FIG. 8, the water absorption layer 10, the holding mat 4, and the insulation layer 5 are hidden by the water interception wall 20 when the inside of the case 3 is viewed from an upstream side of an exhaust gas flow direction. The water interception wall 20 is composed of a material having a water-absorbing property. As shown in FIG. 7, the water interception wall 20 is located on an upper stream side of the exhaust gas flow direction than the catalyst support 2 so that a space 21 is provided between the water interception wall 20 and the catalyst support 2. The space 21 is formed so that condensed water which passes through the penetrating hole 20a and flies toward the catalyst support 2 do not reach to the water absorption layer 10, the holding mat 4, and the insulation layer 5. The water interception wall 20 is fixed on the case 3 so as not to generate a space between the case 3 and itself.

As shown in FIG. 9, in the catalytic converter 1C, when the condensed water CW1 comes along an inner surface of the case 3 from the upper stream side of the exhaust gas flow direction, the condensed water CW1 is stopped by the water interception wall 20 and is absorbed to water interception wall 20. Thereby, the condensed water CW1 do not reach the holding mat 4 and the insulation layer 5. On the other hand, since condensed water CW2 which flies passing through the penetrating hole 20a and flying adheres to the upstream side end face 2a of the catalyst support 2, the condensed water CW2 is absorbed to the catalyst support 2. Thereby, the condensed water CW2 do not reach the holding mat 4.

In the catalytic converter 1C according to the third embodiment, since the water interception wall 20 is provided on the upstream side of the catalyst support 2, the condensed water CW1, CW2 is hard to reach the holding mat 4. Thereby, absorption of the condensed water CW1, CW2 to the holding mat 4 is suppressed. And, it is possible to decrease a quantity of water in the holding mat 4. Accordingly, it is possible to further suppress decreasing of the insulation resistance of the holding mat 4. Furthermore, since the space 21 is provided between the water interception wall 20 and the catalyst support 2, it is possible to prevent the water of the water interception wall 20 from contacting to the catalyst support 2, the holding mat 4, and the insulation layer 5. Thereby, it is possible to prevent the catalyst support 2 and the case 3 from connecting electrically to each other by the water of the water interception wall 20.

In the third embodiment, the water absorption layer 10 may not be provided between the catalyst support 2 and the holding mat 4. Furthermore, the water interception wall 20 may be made of a material not having a water-absorbing property such as metal.

The present invention is not limited to the above-described embodiments, and may be executed in various modes. For example, a catalytic converter which is applied to the present invention is not limited to a catalytic converter having a catalyst support made of silicon carbide. The present invention may be applied to various kinds of catalytic converters having a catalyst support made of a material which produces heat when electric current is applied such as a metallic catalyst support. Furthermore, a catalytic converter which the present invention is applied to is not limited to a catalytic converter for purifying exhaust gas of an internal combustion engine. The present invention may be applied to various kinds of catalytic converters that gas flows in a case and the gas is treated by a catalyst supported on a catalyst support.

The invention claimed is:

1. An electrically-heated catalytic converter comprising a catalyst support which produces heat when electric current is applied, a holding member made of an electrical insulating material, the holding member being provided so as to cover an outer circumference of the catalyst support, and a case which houses the catalyst support and holds the catalyst support via the holding member, wherein
    gas flowing in the case is treated by a catalyst supported on the catalyst support, wherein
    the holding member has a water-absorbing property, and
    an insulation layer made of an electrical insulating material including glass components is provided between the case and the holding member,
    the case is provided with a water interception member which has penetrating hole which the gas passes through and is located on an upper stream side of a gas flow direction than the catalyst support so as to hide the holding member when an inside of the case is viewed from the upper stream side of the gas flow direction, and
    the water interception member is located away from the catalyst support, the holding member, and the insulation layer.

2. The electrically-heated catalytic converter according to claim 1, wherein
    a water absorption layer made of a material having a water-absorbing property is provided between the catalyst support and the holding member.

3. The electrically-heated catalytic converter according to claim 2, wherein
    the water absorption layer has a higher water absorbing property than the holding member.

4. The electrically-heated catalytic converter according to claim 3, wherein
    the catalyst support is made of silicon carbide.

5. The electrically-heated catalytic converter according to claim 2, wherein
the catalyst support is made of silicon carbide.

6. The electrically-heated catalytic converter according to claim 1, wherein
the water interception member is made of a material having a water-absorbing property.

7. The electrically-heated catalytic converter according to claim 6, wherein
the catalyst support is made of silicon carbide.

8. The electrically-heated catalytic converter according to claim 1, wherein
the catalyst support is made of silicon carbide.

\* \* \* \* \*

UNITED STATES PATENT AND TRADEMARK OFFICE
CERTIFICATE OF CORRECTION

| | | |
|---|---|---|
| PATENT NO. | : 8,784,741 B2 | Page 1 of 1 |
| APPLICATION NO. | : 13/638776 | |
| DATED | : July 22, 2014 | |
| INVENTOR(S) | : Yoshioka et al. | |

It is certified that error appears in the above-identified patent and that said Letters Patent is hereby corrected as shown below:

On the title page of the patent, in Item [75] Tatsuo Iida, delete "Anjo-ji (JP)" and insert
    -- Anjo-shi (JP) --.

Signed and Sealed this
Fourteenth Day of October, 2014

Michelle K. Lee
*Deputy Director of the United States Patent and Trademark Office*